(12) United States Patent
Pahk et al.

(10) Patent No.: US 6,269,544 B1
(45) Date of Patent: Aug. 7, 2001

(54) APPARATUS FOR MEASURING THREE-DIMENSIONAL VOLUMETRIC ERRORS IN MULTIAXIS MACHINE TOOL

(75) Inventors: Heui Jae Pahk; Young Sam Kim, both of Seoul (KP)

(73) Assignee: SNU Precision Co., Ltd., Seoul (KR)

( * ) Notice: Subject to any disclaimer, the term of this patent is extended or adjusted under 35 U.S.C. 154(b) by 0 days.

(21) Appl. No.: 09/479,903

(22) Filed: Jan. 10, 2000

(30) Foreign Application Priority Data

Jan. 8, 1999 (KP) ........................................ 99-218

(51) Int. Cl.[7] ................................................. G01C 25/00
(52) U.S. Cl. ............................................. 33/502; 73/1.79
(58) Field of Search .................................. 33/502, 1 BB, 33/503; 73/1.01, 1.79

(56) References Cited

U.S. PATENT DOCUMENTS

| | | | |
|---|---|---|---|
| 4,435,905 | 3/1984 | Bryan | 33/502 |
| 4,884,348 * | 12/1989 | Zeller et al. | 33/502 |
| 4,982,504 * | 1/1991 | Soderberg et al. | 33/502 |
| 5,052,115 | 10/1991 | Burdekin | 33/502 |
| 5,111,590 * | 5/1992 | Park | 33/502 |
| 5,214,857 | 6/1993 | McMurtry et al. | 33/502 |
| 5,647,136 * | 7/1997 | Jostlein | 33/502 |

FOREIGN PATENT DOCUMENTS 61-209857 * 9/1986 (JP) ........................................ 33/502

* cited by examiner

Primary Examiner—Christopher W. Fulton
(74) Attorney, Agent, or Firm—Lowe Hauptman Gilman & Berner, LLP (57) ABSTRACT

An apparatus for measuring three-dimensional volumetric errors in a multiaxis machine tool is disclosed. The apparatus comprises a kinematic ball bar provided with two balls at both ends thereof as a basic construction. A U-shaped bar with two extension arms is integrated with the ball bar. A vertical post is positioned relative to the U-shaped bar and is integrated with one of the two balls. A sleeve is fitted over the post and two guide bars is fixedly and longitudinally assembled with an external surface of the sleeve at opposite positions. Each of the guide bars is provided with a slot at a lower portion thereof for movably receiving an operating pin.

4 Claims, 7 Drawing Sheets

APPARATUS FOR MEASURING THREE-DIMENSIONAL VOLUMETRIC ERRORS IN MULTIAXIS MACHINE TOOL

FIELD OF THE INVENTION

The present invention relates to an apparatus for measuring three-dimensional(hereinafter referred to as "3-d") volumetric errors in a multiaxis machine tool with multiple freedom of degrees, and more particularly to an apparatus for measuring components of both static errors and dynamic errors in such a multiaxis machine tool to assess the error components and to compensate for the 3-d volumetric errors affecting the operational precision of the machine.

Recently, development of efficient techniques for performance verification of the multiaxis machine tools has been considered as an important task for accuracy enhancement and quality assurance for users and manufacturers of multiaxis machine tools and coordinate measuring machines. In order to perform precise position control and to promote accuracy of the multiaxis machine tools, the development of efficient techniques is directed to compensation of the 3-d volumetric errors or volumetric errors, since it is very essential to measure and analyze each error component and to compensate the 3-d volumetric errors.

The static errors include geometric errors, kinematic errors, and thermal errors, etc. and dynamic errors include errors due to servo gain mismatch and dynamic characteristics. Such 3-d volumetric errors which are generated during the operation of the multiaxis machine tool directly affect the machining precision in addition to the measuring precision of the machine tools as described above. Therefore, it has been well known to the manufacturers and users of multiaxis machine tools that the technique precisely and effectively measuring and assessing the 3-d volumetric errors in such machine tools is a prerequisite for accuracy enhancement and quality assurance.

The basic construction of the 3-d volumetric error measuring apparatus according to the present invention is accomplished by a kinematic ball bar consisting of a pair of balls. Such a kinematic ball bar has been well known to those skilled in the art as disclosed in U.S. Pat. Nos. 4,435,905, 5,052,115 and 5,214,857. Such a conventional 3-d volumetric error measuring apparatus uses a longitudinal bar, so-called "kinematic ball bar" which is provided with a ball at each end. Of the two balls, the first one is engaged with a socket of a movable toolholder, while the second one is engaged with a socket of a fixed workholder. In an operation of the machine tool, the toolholder moves while tracing a circle around the ball being engaged with the socket of the workholder.

However, the apparatus of the above U.S. patents are different from each other in that they have different constructions and different driving mechanisms except for the above-mentioned basic construction with a kinematic ball bar. Each apparatus of the above U.S. patent thus has intrinsic operational characteristics in addition to merits and demerits.

In the same manner as disclosed in the above U.S. patents, the apparatus according to the present invention has a kinematic ball bar provided with a ball at each end. However, the apparatus of the present invention is characterized in that it has an intrinsic driving mechanism which is designed to be used with the two balls in the measurement of the 3-d volumetric errors in multiaxis machine in a way different from those of the above U.S patents.

SUMMARY OF THE INVENTION

It is an object of the present invention to provide an apparatus for measuring three-dimensional volumetric errors in a multiaxis machine tool which has a newly designed and intrinsic driving mechanism in the two balls provided at both ends of a kinematic ball bar.

According to the present invention, this object is achieved. There is provided an apparatus for measuring three-dimensional volumetric errors in a multiaxis machine tool comprising, a ball bar having a predetermined length and provided with a displacement sensor therein, and having a movable contact member at an outside thereof with an outside end surface of the contact member being flat; a U-shaped bar having two opposite extension arms and integrated with one end of said ball bar, each of the extension arms having a hole at a predetermined position with an operating pin being fitted into the hole; a first ball provided at the other end of said ball bar and detachably set in a stationary magnetic socket assembly; a second ball positioned to have always a ball and flat contact with the flat end surface of the movable contact member of the sensor; a vertical post perpendicularly positioned relative to said U-shaped bar and integrated with said second ball at a lower end thereof; a sleeve fitted over said post; and two guide bars fixedly and longitudinally assembled with an external surface of said sleeve at opposite positions, each of said guide bars being provided with a slot at a lower portion thereof for movably receiving the operating pin.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which the preferred embodiments of the invention are illustrated.

DETAILED DESCRIPTION OF THE PREFERRED EMBODIMENT

This invention will be described in further detail by way of embodiment with reference to the accompanying drawings.

Figure 1:
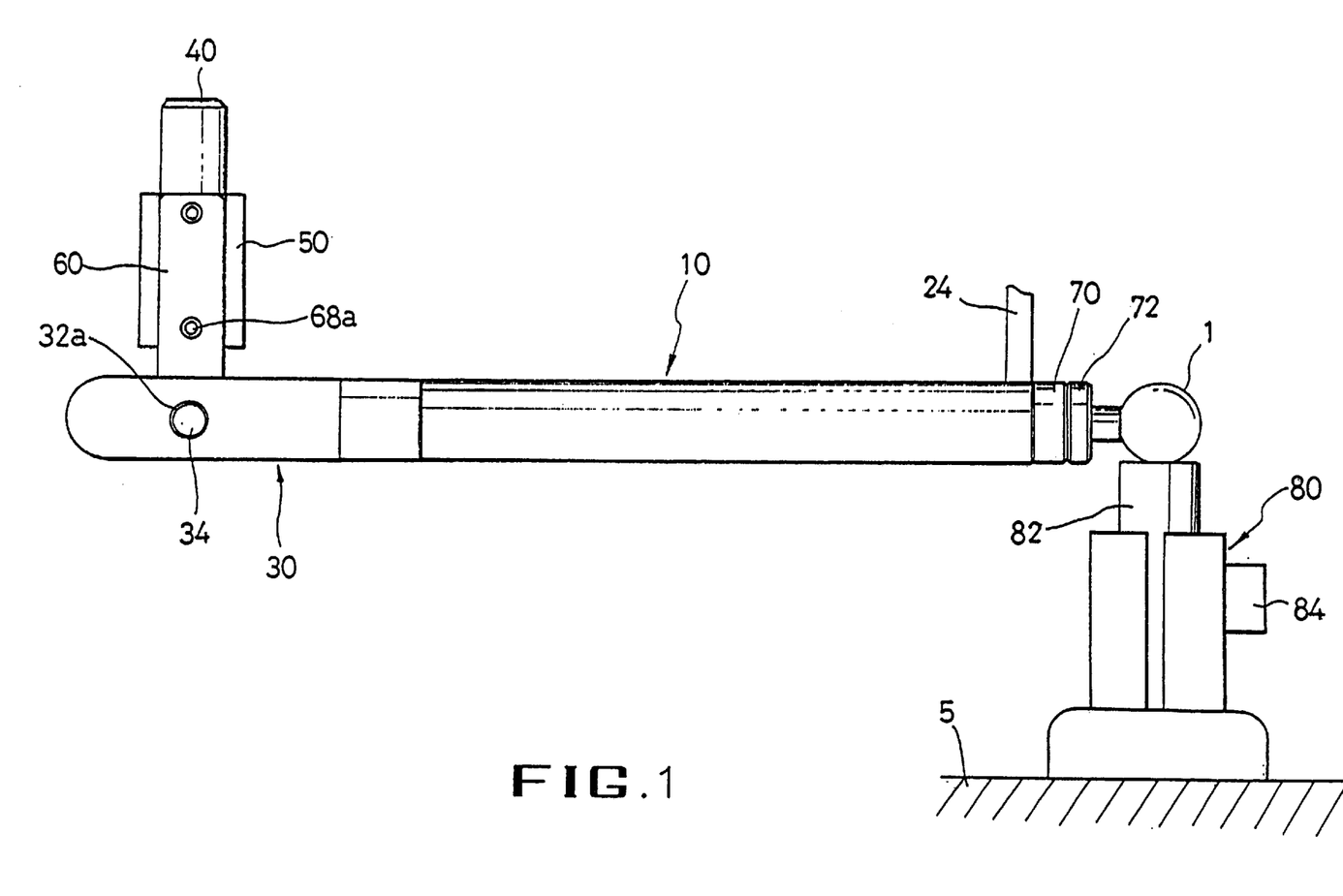
FIG. 1 is a side view of a measuring apparatus in accordance with a primary embodiment of the present invention.
Figure 2:
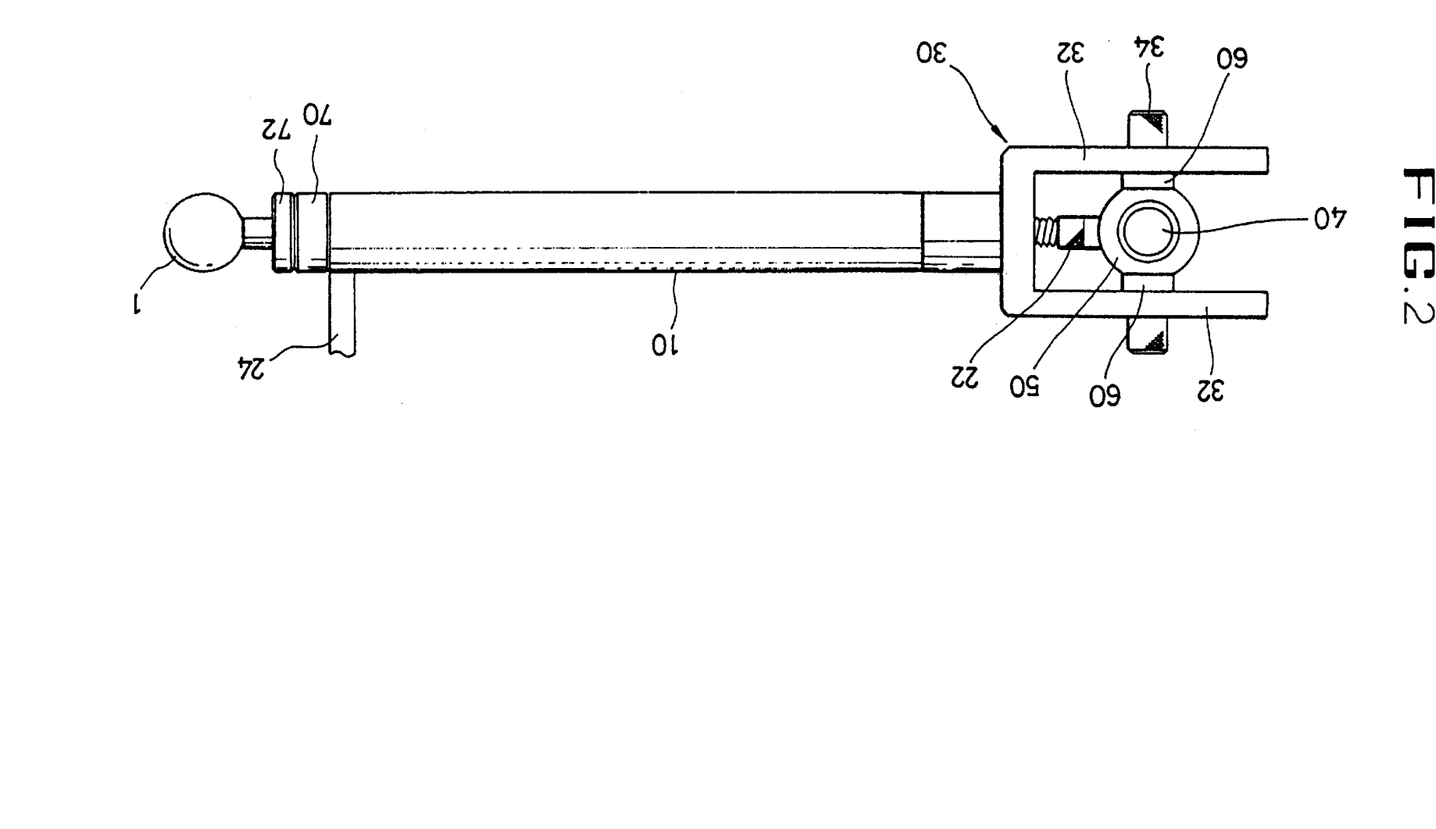
FIG. 2 is a plan view of the apparatus of FIG. 1.
Figure 3:
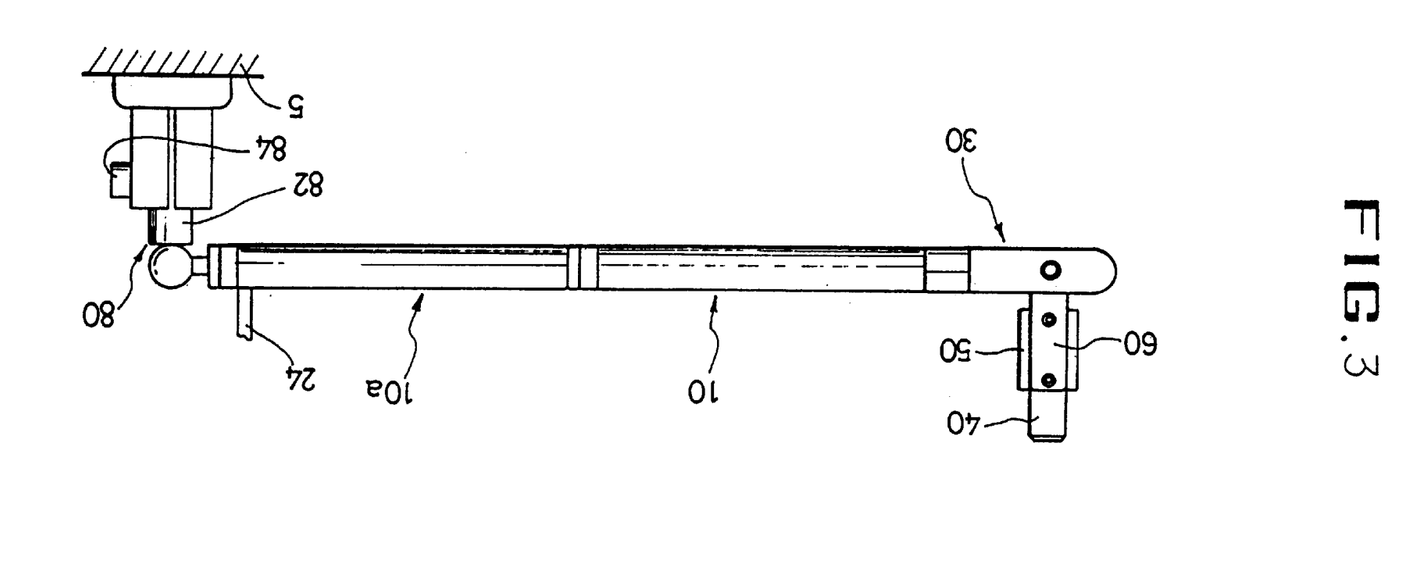
FIG. 3 is a side view of a measuring apparatus in accordance with another embodiment of the present invention.
Figure 4:
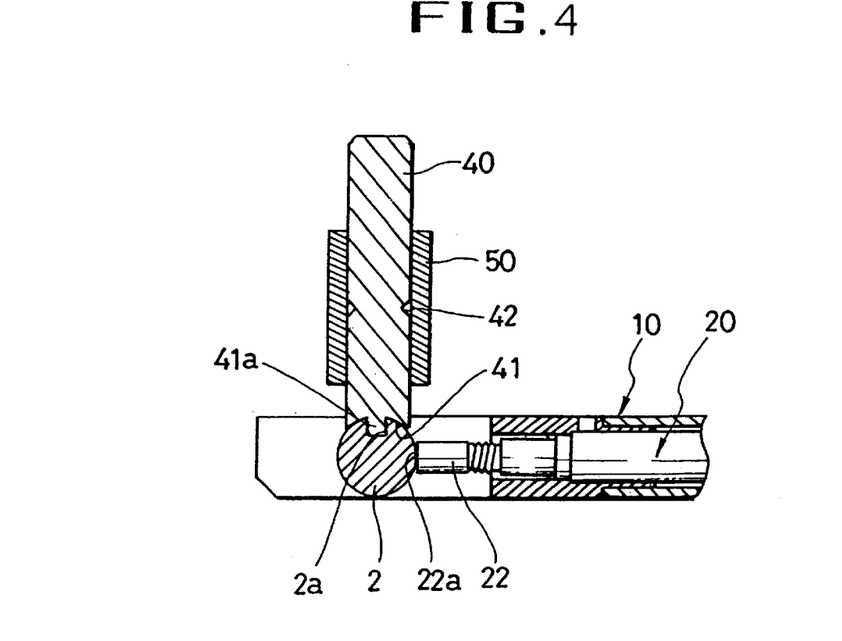
FIG. 4 is a partially cross-sectioned view of a ball bar and a U-shaped bar showing a structure for holding a second ball in the apparatus of the present invention.

Referring to FIG. 1 and FIG. 2, an apparatus according to the present invention comprises a kinematic ball bar 10 with two balls. First ball 1 and second ball 2 are provided at both ends of the ball bar 10. The ball bar 10 has a predetermined length. In the present invention, it is possible to adjust the overall length of the ball bar by connecting an additional ball bar 10a to the main ball bar 10 as shown in FIG. 3. The ball bar 10 has a linear variable differential transducer (hereinafter referred to as "LVDT") 20 therein which is used as a device for detecting displacements between the first ball 1 and the second balls 2. The displacement data signals from the LVDT 20 are transmitted to a control processor(not shown) through a cable 24. As best seen in FIG. 4, the LVDT 20 has a movable contact member 22 which axially extends out of one end of the ball bar 10. The outside end surface 22a of the contact member 22 is flat and comes into point contact with the second ball 2 That is, the second ball 2 always comes into ball and flat contact with the contact member 22. Therefore, it is possible for the contact member 22 to be always brought into contact with the second ball 2 regardless of the position of the center of the second ball 2.

Figure 8:
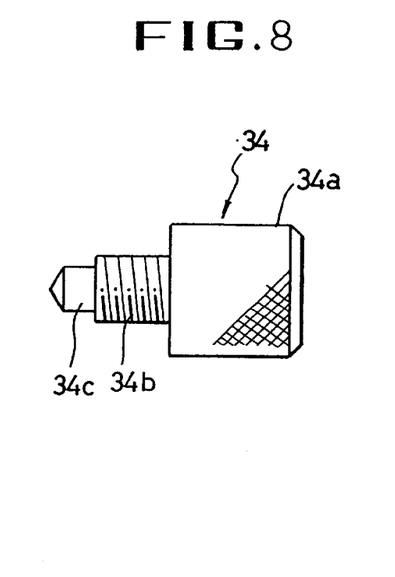
FIG. 8 is a side view of a guide bar operated in conjunction with the guide bar of FIG. 7A and FIG. 7B.

A U-shaped bar 30 with two extension arms 32 is integrated with the ball bar 10. The contact member 22 of the LVDT 20 passes into the U-shaped bar so as to be placed between the two extension arms of the bar 30. A threaded hole 32a is formed at a middle portion of each extension arm 32. An operating pin 34 is fitted into the threaded hole 32a. As best seen in FIG. 8, the operating pin 34 has a knob 34a, and a threaded shank 34b, and a conical guide projection 34c. The threaded shank 34b of the operating pin 34 is integrated with the knob 34a and is threaded into the threaded hole 32a. The outside end of the shank 34b is formed by the conical guide projection 34c. In the preferred embodiment of the present invention, each extension arm 32 of the U-shaped bar 30 has a threaded hole 32a, while each operating pin 34 has a threaded shank 34b. However, it should be understood that the engagement of the operating pin 34 with each arm 32 may be accomplished by other conventional fitting constructions in place of such a thread engagement construction without affecting the function of the present invention.

Figure 5:
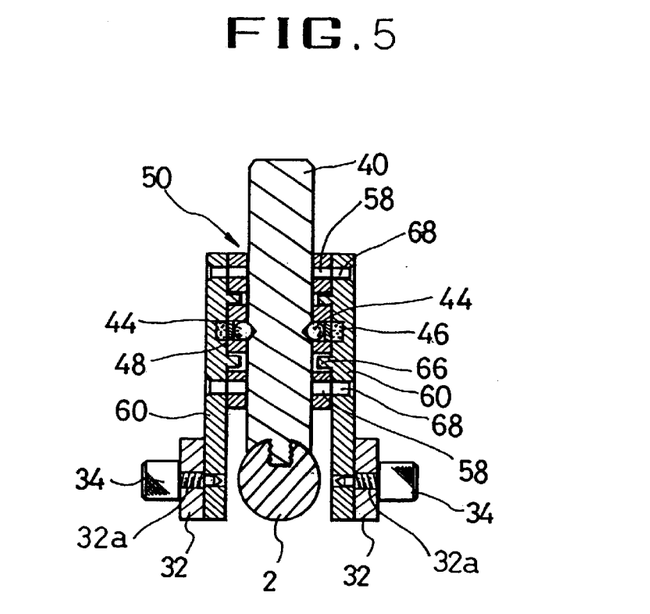
FIG. 5 is a transverse cross-sectional view of the U-shaped bar illustrating the structure for holding a second ball in the apparatus of the present invention.
Figure 7A:
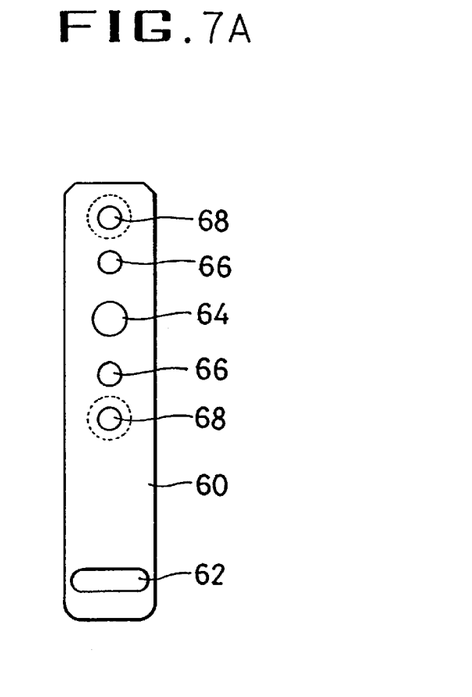
FIG. 7A and FIG. 7B are a plan view and side view of a guide bar of the present invention.

As shown in FIG. 5, the second ball 2 is fixed to the lower end of a vertical post 40 at a position within the U-shaped bar 30. The post is designed to be moved along with a spindle(not shown) of a multiaxis machine tool. The post 40 is set in a sleeve 50 which is assembled with two external guide bars 60. Referring to FIG. 7A along with FIG. 5, the lower ends of the two guide bars 60 are individually provided with a slot 62 into which the guide projection 34c of the operating pin 34 is movably fitted. Therefore, the two guide bars 60 are operatively coupled to the two extension arms 32 of the U-shaped 30.

Figure 6A:
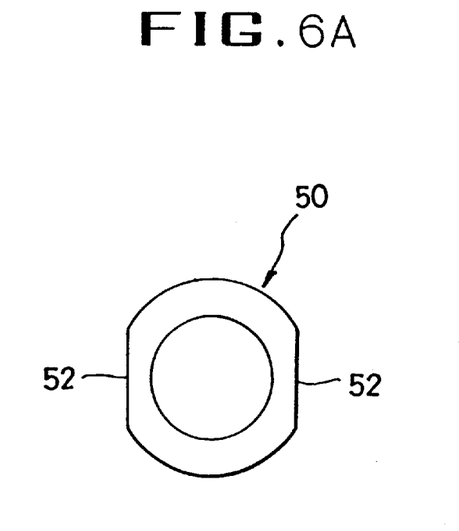
FIG. 6A and FIG. 6B are a plan view and a side view of a sleeve of the present invention.
Figure 6B:
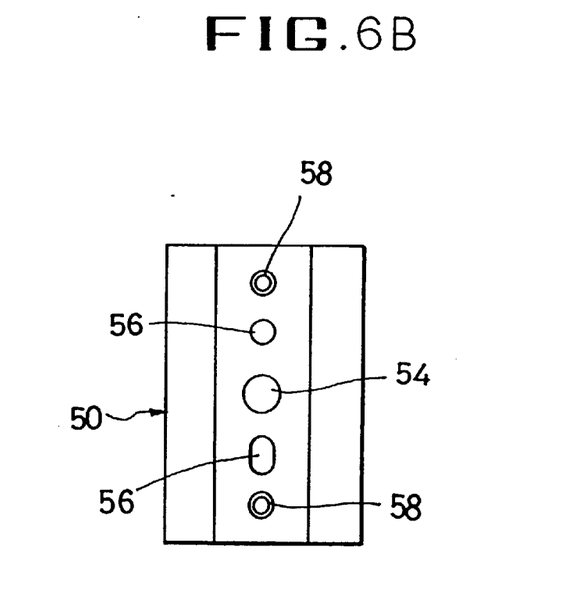
Figure 7B:
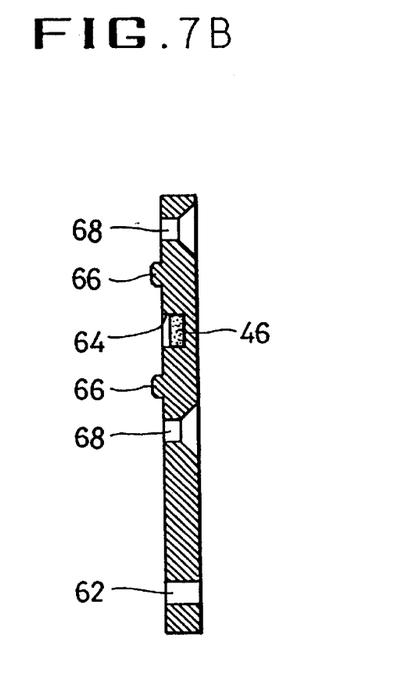

The construction of the vertical post 40, the sleeve 50 and the guide bars 60 which are the characteristic elements of the apparatus according to the present invention will be described hereinbelow in more detail. As shown in FIG. 4 and FIG. 5, the post 40 has a circumferential groove 42 at a middle portion thereof. Two small balls 44 are movable seated in the groove 42 at opposite positions. The sleeve 50 has a generally cylindrical configuration. However, both opposite external surfaces 52 of the sleeve 50 are longitudinally planar. as shown in FIG. 6A and FIG. 6B. The sleeve 50 has two ball fitting holes 54 on the planar surfaces 52 at opposite positions. The two small balls 44 are movably held in the two ball fitting holes 54, respectively. Two guide holes 56 are formed on each planar surface 52 at upper and lower positions of the ball fitting hole 54. The guide holes 56 are used as reference points when each guide bar 60 engages with the planar surface 52 of the sleeve 50 as will be described hereinafter. The sleeve 50 also has two first threaded holes 58 on each planar surface 52 at upper and lower positions of the guide holes 56. The threaded holes 58 allow each guide bar 60 to be assembled with the sleeve 50 using set screws 68a. Referring to FIG. 7A and FIG. 7B, each guide bar 60 has two second threaded holes 68 at positions corresponding to the two first threaded holes 58 of the sleeve 50. The guide bar 60 also has two projections 66 which are inserted into the two guide holes 56 formed on each planar surface 52 of the sleeve 50. A spring seat groove 64 is formed at the middle portion of each guide bar 60. A biasing means 46 seated in the spring seat groove 64 elastically biases the ball 44 held in the ball fitting hole 54 of the sleeve 50. A spacer 48 is interposed between the ball 44 and the biasing means 46 as shown in FIG. 5.

In order to fixedly mount the second ball 2 to the lower end of the vertical post 40, a concave seat 41 is formed on the lower end of the post 40 in a way such that the second ball 2 is substantially seated in the concave seat 41. A bolt 41a integrally extends downwardly from the center of the concave seat 41, while an threaded hole 2a is formed on the external surface of the second ball 2 to engage the bolt 41a of the post 40 with the threaded holes 2a of the second ball 2.

Figure 9:
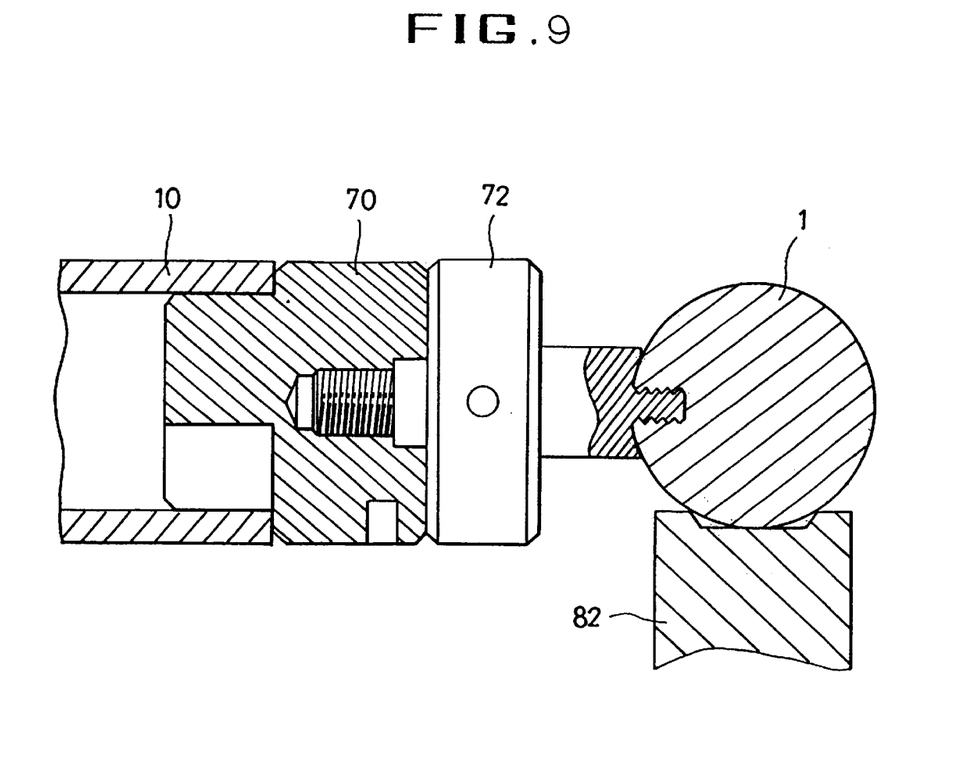
FIG. 9 is a longitudinal cross-sectional view of the ball bar showing a structure for holding a first ball in the apparatus of the present invention.

Referring to FIG. 1, the first ball 1 is fixedly mounted to the other end of the ball bar 10 using an end block 70 and an extension block 72. The end block 70 is assembled with the end of the ball bar 10 through a fitting process, while the extension block 72 is assembled with the end block 70 through a screwing process as shown in FIG. 9. The first ball 1 is fixedly mounted to the extension block 72 in the same manner as that described for the second ball 2 fixedly mounted to the post 40. The first ball 1 fixed to the end of the ball bar 10 is detachably set in a magnetic socket assembly 80 which is fixedly held on a stationary surface 5. The first ball 1 is detachably seated on a joint 82 of the assembly 80. The joint 82 is properly controlled by a clamping unit 84. The construction and operation of such a magnetic socket assembly 80 is well known to those skilled in the art and further explanation is omitted in here.

In an operation of the measuring apparatus according to the present invention, the second ball 2 is moved along with a spindle of a multiaxis machine tool. During the movement of the second ball 2, the LVDT 20 detects variations in spacing the first ball 1 and the second ball 2 and outputs variation data signals to the control processor. The processor calculates the components of 3-d volumetric errors in the multiaxis machine tool using a program with the variation data from the LVDT 20. Therefore, the calculated error components are compensated.

The invention is in no way limited to the embodiment described hereinabove. Various modifications of disclosed embodiment as well as other embodiments of the invention will become apparent to persons skilled in the art upon reference to the description of the invention. It is therefore contemplate that the appended claims will cover any such modification or embodiments as fall within the true scope of the invention.

What is claimed is:

1. An apparatus for measuring three-dimensional volumetric errors in a multiaxis machine tool comprising:
   a ball bar having a predetermined length and provided with a displacement sensor therein, and having a movable contact member at an outside thereof with an outside end surface of the contact member being flat;

a U-shaped bar having two opposite extension arms and integrated with one end of said ball bar, each of the extension arms having a hole at a predetermined position with an operating pin being fitted into the hole;

a first ball provided at the other end of said ball bar and detachably set in a stationary magnetic socket assembly;

a second ball positioned to have always a ball and flat contact with the flat end surface of the movable contact member of the sensor;

a vertical post perpendicularly positioned relative to said U-shaped bar and integrated with said second ball at a lower end thereof;

a sleeve fitted over said post; and two guide bars fixedly and longitudinally assembled with an external surface of said sleeve at opposite positions, each of said guide bars being provided with a slot at a lower portion thereof for movably receiving the operating pin.

2. An apparatus as recited as claim 1, wherein said post has a circumferential groove at a middle portion thereof with two small balls being seated in the circumferential groove at opposite positions and said sleeve has two planar surfaces formed at each of opposite external sides and has two ball fitting holes on a middle portion thereof to movably hold each of the small balls in the ball fitting holes and has two first threaded holes being formed on each of the planar surfaces at upper and lower positions of each of the ball fitting holes, and each of said two guide bars has tow second threaded holes at positions corresponding to the two first threaded holes of said sleeve with biasing means being provided between said sleeve and each of said tow guides bars so as to elastically bias the small balls.

3. An apparatus as recited as claim 2, wherein said sleeve has a guide hole formed on each planar surface thereof and each of said two guide bars has a projection thereon which is inserted into the guide holes of the said sleeve to assemble said guide bars with said sleeve.

4. An apparatus as recited as claim 1, wherein a concave seat is formed on a lower end of said post with a bolt integrally extending downwardly from a center of the concave seat, and an integrally threaded hole is radially formed on an external surface of said second ball whereby the integrally threaded threaded hole of said second ball is engaged with the bolt of said post to fix said second ball to the lower end of said post.

* * * * *